US009576422B2

(12) United States Patent
Bowers et al.

(10) Patent No.: US 9,576,422 B2
(45) Date of Patent: Feb. 21, 2017

(54) SYSTEMS, METHODS, AND DEVICES FOR OPERATING WAGERING GAME MACHINES WITH ENHANCED USER INTERFACES

(71) Applicant: WMS Gaming Inc., Waukegan, IL (US)

(72) Inventors: Travis L. Bowers, Chicago, IL (US); Christopher T. Fester, Des Plaines, IL (US); Jesse L. Garvey, Chicago, IL (US); Samuel D. Ralston, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 342 days.

(21) Appl. No.: 14/254,077

(22) Filed: Apr. 16, 2014

(65) Prior Publication Data

US 2014/0315619 A1 Oct. 23, 2014

Related U.S. Application Data

(60) Provisional application No. 61/813,306, filed on Apr. 18, 2013.

(51) Int. Cl.
*A63F 13/00* (2014.01)
*G07F 17/32* (2006.01)

(52) U.S. Cl.
CPC .................................. *G07F 17/3213* (2013.01)

(58) Field of Classification Search
CPC .. G07F 17/32; G07F 17/3202; G07F 17/3204; G07F 17/3209; G07F 17/3211; G07F 17/3227; G07F 17/3232
USPC ............................................ 463/16, 20, 25
See application file for complete search history.

(56) References Cited

U.S. PATENT DOCUMENTS

| | | | |
|---|---|---|---|
| 4,484,179 | A | 11/1984 | Kasday |
| 4,746,770 | A | 5/1988 | McAvinney |
| 4,968,877 | A | 11/1990 | McAvinney et al. |
| 5,511,148 | A | 4/1996 | Wellner |
| 5,589,856 | A | 12/1996 | Stein et al. |
| 5,808,567 | A | 9/1998 | McCloud |
| 5,896,126 | A | 4/1999 | Shieh |
| 5,943,043 | A | 8/1999 | Furuhata et al. |

(Continued)

FOREIGN PATENT DOCUMENTS

JP 2013-056143 A † 3/2013

*Primary Examiner* — James S McClellan
(74) *Attorney, Agent, or Firm* — Nixon Peabody LLP

(57) ABSTRACT

Gaming devices, gaming systems, methods of conducting wagering games, and computer programs for operating wagering game machines are disclosed. A gaming machine for conducting a wagering game is disclosed. The gaming machine includes a first display device that is configured to display aspects of the wagering game. The first display device includes a touchscreen configured to receive user inputs. The gaming machine also includes a second display device that is configured to display a plurality of user-selectable elements. The second display device is further configured to display a selection mechanism in response to a first user input received from a user via the touchscreen of the first display device. The second display device is also configured, in response to a second user input received from the user via the touchscreen of the first display device, to display the selection mechanism selecting at least one of the displayed user-selectable elements.

20 Claims, 8 Drawing Sheets

(56) References Cited

U.S. PATENT DOCUMENTS 5,947,822 A 9/1999 Weiss
6,067,112 A 5/2000 Wellner et al.
6,246,395 B1 6/2001 Goyins et al.
6,255,604 B1 7/2001 Tokioka et al.
6,390,473 B1 5/2002 Vancura et al.
6,468,156 B1 10/2002 Hughs-Baird et al.
6,517,433 B2 2/2003 Loose
6,677,932 B1 1/2004 Westerman
6,788,295 B1 9/2004 Inkster
6,819,312 B2 11/2004 Fish
6,856,259 B1 2/2005 Sharp
6,884,173 B2 4/2005 Gauselmann
6,932,706 B1 8/2005 Kaminkow
7,077,009 B2 7/2006 Lokhorst et al.
7,204,428 B2 4/2007 Wilson
7,254,775 B2 8/2007 Geaghan et al.
7,294,059 B2 11/2007 Silva
7,311,601 B2 12/2007 Anderson et al.
RE40,153 E 3/2008 Westerman et al.
7,379,562 B2 5/2008 Wilson
7,397,464 B1 7/2008 Robbins et al.
7,411,575 B2 8/2008 Hill et al.
7,479,949 B2 1/2009 Jobs et al.
7,798,902 B2 9/2010 Rasmussen
8,025,568 B2 9/2011 Loose
8,241,912 B2 8/2012 Loose
8,317,592 B2 11/2012 Anderson et al.
8,721,436 B2 5/2014 Hamlin et al.
2002/0097223 A1 7/2002 Rosenberg et al.
2002/0151360 A1* 10/2002 Durham .................. A63F 13/10
463/30
2002/0173354 A1 11/2002 Winans
2003/0067447 A1 4/2003 Geaghan et al.
2003/0114215 A1 6/2003 Adams et al.
2003/0119579 A1* 6/2003 Walker .................... G07F 17/32
463/20
2003/0195031 A1 10/2003 O'Donovan et al.
2004/0001048 A1 1/2004 Kraus et al.
2004/0038721 A1 2/2004 Wells
2004/0166937 A1 8/2004 Rothschild et al.
2005/0059458 A1 3/2005 Griswold et al.
2005/0113163 A1 5/2005 Mattice et al.
2005/0227217 A1 10/2005 Wilson
2005/0259378 A1 11/2005 Hill et al.
2006/0001652 A1 1/2006 Chiu et al.
2006/0010400 A1 1/2006 Dehlin et al.
2006/0031786 A1 2/2006 Hillis et al.
2006/0073891 A1 4/2006 Holt
2006/0101354 A1 5/2006 Hashimoto et al.
2006/0164399 A1 7/2006 Cheston et al.
2006/0284874 A1 12/2006 Wilson
2006/0294247 A1 12/2006 Hinckley et al.
2007/0093290 A1 4/2007 Winans et al.
2007/0117614 A1 5/2007 Duhamel
2007/0124370 A1 5/2007 Nareddy et al.
2007/0152984 A1 7/2007 Ording et al.
2007/0177803 A1 8/2007 Elias et al.
2007/0201863 A1 8/2007 Wilson et al.
2007/0247435 A1 10/2007 Benko et al.
2007/0270203 A1 11/2007 Aida
2008/0096655 A1 4/2008 Rasmussen
2008/0158145 A1 7/2008 Westerman et al.
2008/0158146 A1 7/2008 Westerman et al.
2008/0158147 A1 7/2008 Westerman et al.
2008/0158168 A1 7/2008 Westerman et al.
2008/0158169 A1 7/2008 O'Connor et al.
2008/0158174 A1 7/2008 Land et al.
2008/0163130 A1 7/2008 Westerman
2008/0180654 A1 7/2008 Bathiche et al.
2008/0211766 A1 9/2008 Westerman et al.
2008/0231611 A1 9/2008 Bathiche et al.
2008/0309631 A1 12/2008 Westerman et al.
2008/0309634 A1 12/2008 Hotelling et al.
2009/0002327 A1 1/2009 Wilson et al.
2009/0002344 A1 1/2009 Wilson et al.
2009/0021489 A1 1/2009 Westerman et al.
2010/0069160 A1 3/2010 Barrett et al.
2010/0234099 A1 9/2010 Rasmussen et al.
2012/0122549 A1 5/2012 Rasmussen et al.
2014/0051500 A1 2/2014 Anderson

* cited by examiner
† cited by third party

SYSTEMS, METHODS, AND DEVICES FOR OPERATING WAGERING GAME MACHINES WITH ENHANCED USER INTERFACES

CLAIM OF PRIORITY AND CROSS-REFERENCE TO RELATED APPLICATION

This application claims the benefit of priority to U.S. Provisional Patent Application No. 61/813,306, which was filed on Apr. 18, 2013, and is incorporated herein by reference in its entirety and for all purposes.

COPYRIGHT

A portion of the disclosure of this patent document contains materials which are subject to copyright protection. The copyright owner has no objection to the facsimile reproduction by anyone of the patent disclosure as it appears in the U.S. Patent and Trademark Office patent files or records, but otherwise reserves all copyright rights whatsoever.

TECHNICAL FIELD

The present disclosure relates generally to wagering games, as well as wagering game devices, gaming systems, and methods for executing wagering games. More particularly, aspects of the present disclosure relate to user interfaces for operating and configuring wagering game systems, wagering game terminals, portable gaming devices, and the like.

BACKGROUND

Gaming terminals, such as slot machines, video poker machines and the like, have become a cornerstone of the gaming industry. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Thus, gaming manufacturers continuously endeavor to develop new games and improved gaming enhancements that will attract frequent play and player loyalty through enhanced entertainment value to the player.

One concept that has been successfully employed to enhance the entertainment value of a game is the concept of a "secondary" or "bonus" game that may be played in conjunction with a "primary" or "basic" game. The bonus game may comprise any type of game, either similar to or completely different from the basic game, which is entered upon the occurrence of a selected event or outcome during play of the basic game. Generally, bonus games provide a greater expectation of winning than the basic game and may also be accompanied with more attractive or unusual video displays and/or audio.

Another concept that has been employed is the use of progressive jackpots. In the gaming industry, a "progressive jackpot" involves collecting coin-in data from participating gaming device(s), such as slot machines, contributing a percentage of that coin-in data to a jackpot amount, and awarding that jackpot amount to a player upon the occurrence of a jackpot-winning event. A jackpot-winning event typically occurs when a "progressive winning position" is achieved at a participating gaming device. If the gaming device is a slot machine, a progressive winning position may, for example, correspond to alignment of progressive jackpot reel symbols along an active payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate.

There are three main types of wagering game machines: mechanical, electromechanical, and electronic. The original slot machine, for example, was entirely mechanical in construction, working on an elaborate configuration of springs, gears, shafts, brakes and levers. Since its introduction in the early 1960's, the electromechanical gaming machine began replacing most, if not all, mechanical slot machines. Electromechanical gaming machines typically use one or more microprocessors to determine a random outcome, and electrical stepper motors to spin and stop a set of mechanical reels to display the game outcome. The electronic gaming machine (EGM), in comparison, subsequently supplanted the mechanical reels of the electromechanical gaming machine with simulated mechanical reels generated by a video display device. In addition to slot-type wagering games, traditional table games, such as poker, blackjack, keno, and bingo, were adapted for use on EGM's.

The advent of microprocessors has significantly advanced the state of the art of electronic gaming. For instance, microprocessors offer gaming machines much greater latitude in determining random game outcomes. Random game outcomes are typically determined by a random number generator (RNG) that is driven by a central processing unit (CPU). A probability table contains all possible game outcomes, with each game outcome being linked to a distinct number. Once generated, the random number is used to look up the corresponding game outcome in the probability table. In electro-mechanical configurations, the CPU then signals the stepper motors to drive and position the reels to coincide with the randomly determined game outcome. Microprocessor-driven EGM's allow gaming manufacturers to design slot games with more flexible pay tables. In a specific example, microprocessor-driven gaming machines can offer high value, low probability awards while contemporaneously offering low value, high probability awards—offering a range of awards that an all-mechanical slot machine cannot.

The increased power of modern microprocessors has enabled the introduction of new gaming machine capabilities that allow the addition of entirely new classes of features and functions. Many EGM designs allow these features and functions to be enabled in a variety of different combinations to operate on a wide variety of different technological platforms. Enabling these features oftentimes requires they be configured to casino specifications, without departing from state gaming regulations, when the EGM's are first set up on the casino floor. These configuration parameters can enable the gaming machine to network with the casino's existing central computer systems, for example, to coordinate with the casino's cashless gaming systems, wagering processes, accounting procedures, player-tracking data collection, etc.

Networking a gaming machine to a gaming establishment's central computer system typically requires the machine be configured to establish communication, including selection of communication protocols for communication between the gaming machine and host system. This may include selection of the host ports for electronic funds transfers, establishing gaming machine communication addresses, host communication protocol bonus control, etc. As part of the initial set up process, a number of configuration parameters may also be set to customize the gaming machine, for example, to comport with the wagering processes used by a particular gaming establishment. These specifications can include the selection of payout devices (e.g., hopper, ticket printer, cashless player account, etc.), selection of payout options (e.g., split pays from both the hopper and ticket printer), and controlling ticket printer parameters. The gaming machine may also be configured to customize the presentation of the game. These configuration parameters can include, in some non-limiting examples: screen brightness, lighting control, speaker volume, presentation of multiple games, payback percentages, etc. Some additional miscellaneous configuration categories include: ticket-in control configuration, validation control, and gaming machine operating modes (including demonstration and diagnostic mode). Within each of these categories can be a number of different selections, and even sub-selections.

The number and complexity of configuration parameters can require considerable technician time during the initial setup process. Historically, the configuration process required selecting and implementing operating parameters for each gaming machine, with the gaming machine being manually configured through a set of administrative menus. Some parameters require multiple menus and value entries to be completely configured. For some electronic gaming machines, the technician is provided with instructions and options displayed on a video display for each configuration parameter, and the technician selects configuration parameters using a mouse, button panel or keyboard. This can be a time-consuming, tedious, and, in some instances, error-prone process. What is needed are new methods and devices for configuring wagering game machines to increase the accuracy and efficiency of the configuration process.

SUMMARY

Aspects of the present disclosure are directed to enhanced user interfaces for operating gaming systems, gaming terminals, gaming devices and/or gaming machines. In one exemplary configuration, a gaming machine is disclosed with two electronic video display devices. The first display device is configured to display aspects of a wagering game, such as base-game outcomes, and is outfitted with a touchscreen. The second display device, in contrast, is configured to display a plurality of selectable elements, such as an administrator configuration menu with a variety of user-selectable operator setup options. The second display device can also be configured to display aspects of a wagering game, such as bonus-game outcomes and game information. Once the selectable elements are displayed on the second display device, a user can activate a cursor or other selection mechanism on the second display device by touching the touchscreen of the first display device. The user can then select one of the selectable elements displayed on the second display device with the cursor by entering a second input via the touchscreen of the first display device. For example, the player can activate the cursor by touching the touchscreen of the first display device, slide his/her finger across the touchscreen to move the cursor to overlay one of the selectable elements, and then disengage their finger from the touchscreen or "double tap" the touchscreen to select that selectable element.

In some embodiments, the touchscreen on the first display device is "absolutely mapped" to the display area of the second display device such that each touch-sensitive location of the touchscreen corresponds to a respective location of the second display device. Alternatively, the touchscreen on the first display device is "relatively mapped" to the display area of the second display device such that the user can manipulate any touch-sensitive portion of the touchscreen, or any touch-sensitive portion within a select subsection of the touchscreen, to control the selection mechanism on the second display device. For some configurations, the first display device includes a transmissive liquid crystal display (LCD) device that is positioned in front of a plurality of mechanical reels, and the transmissive display is capable of displaying images associated with a wagering game around, but not in front of, the mechanical reels.

According to one aspect of the present disclosure, a gaming machine for conducting a wagering game is disclosed. The gaming machine includes a first display device that is configured to display aspects of the wagering game. The first display device includes a touchscreen that is configured to receive user inputs. The gaming machine also includes a second display device that is configured to display a plurality of user-selectable elements. The second display device is further configured to display a selection mechanism in response to a first user input received from a user via the touchscreen of the first display device. The second display device is also configured, in response to a second user input received from the user via the touchscreen of the first display device, to display the selection mechanism selecting at least one of the displayed user-selectable elements.

According to another aspect of the present disclosure, a gaming system for conducting a wagering game is presented. The gaming system includes first and second display devices, one or more processors, and one or more memory devices. The first display device is configured to display aspects of the wagering game, and includes a touchscreen that is configured to sense user inputs and output signals indicative thereof. The second display device is configured to display aspects of the wagering game as well as a variety of user-selectable operator setup options. The one or more processors are operatively connected to the display devices to transmit signals therebetween. The one or more memory devices store instructions that, when executed by at least one of the one or more processors, cause the gaming system to: receive an indication of a wager to play the wagering game; responsive to the received indication of the wager, direct the first display device to display a randomly determined outcome of the wagering game; direct the second display device to display the user-selectable operator setup options; responsive to a first signal from the touchscreen of the first display device indicating receipt of a first user input, direct the second display device to display a selection mechanism; and, responsive to a second signal from the touchscreen of the first display device indicating receipt of a second user input, direct the second display device to display the selection mechanism selecting at least one of the user-selectable operator setup options.

According to yet another aspect of the present disclosure, a free-standing gaming terminal is featured. The gaming terminal includes a wager input device configured to receive an indication of a wager from a player to play a wagering game. Also included is a primary display with a plurality of symbol-bearing reels, a transmissive liquid crystal display (LCD) device positioned in front of the symbol-bearing reels, and a touchscreen overlaying at least a portion of the transmissive LCD device. The touchscreen is configured to sense user inputs and output signals indicative thereof. The gaming terminal also includes a secondary display with an electronic video display device configured to display an administrator configuration menu with a variety of user-selectable operator setup options. The secondary display lacks a touchscreen. One or more processors are connected to the primary and secondary displays to transmit signals therebetween. At least one of the one or more processors is configured to: responsive to the indication of the wager received via the wager input device, direct the symbol-bearing reels to spin and stop to reveal a randomly determined outcome of the wagering game, and direct the transmissive LCD device to display images associated with the outcome of the wagering game; direct the electronic video display device of the secondary display to display the operator setup options; responsive to an activation signal from the touchscreen of the primary display indicating receipt of an activation input from the user, direct the electronic video display device to display a previously hidden cursor; responsive to a control signal from the touchscreen of the primary display indicating receipt of a control input from the user, direct the electronic video display device to display the cursor moving to and at least partially overlaying one of the operator setup options; and, responsive to a selection signal from the touchscreen of the primary display indicating receipt of a selection input from the user, direct the electronic video display device of the secondary display to display the cursor selecting one of the user-selectable elements, and then display the cursor disappearing.

Other aspects of the present disclosure are directed to a method of operating a gaming machine for conducting a wagering game. The gaming machine includes one or more input devices, one or more display devices, and one or more processors. The method includes: receiving an indication of a wager to play the wagering game; directing, via at least one of the processors, a first of the one or more display devices to display a randomly determined outcome of the wagering game, wherein the first display device includes a touchscreen configured to receive user inputs; directing, via at least one of the processors, a second of the one or more display devices to display a plurality of user-selectable elements; receiving, via the touchscreen of the first display device, a first user input; responsive to receipt of the first user input via the touchscreen, directing the second display device to display a selection mechanism; receiving, via the touchscreen of the first display device, a second user input; and, responsive to receipt of the second user input via the touchscreen, directing the second display device to display the selection mechanism selecting at least one of the user-selectable elements.

In accordance with additional aspects of this disclosure, one or more physical non-transitory machine-readable storage media are featured which include instructions which, when executed by one or more processors, cause the one or more processors to direct a gaming terminal and/or a gaming system to perform any of the operations disclosed herein.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

Figure 1:
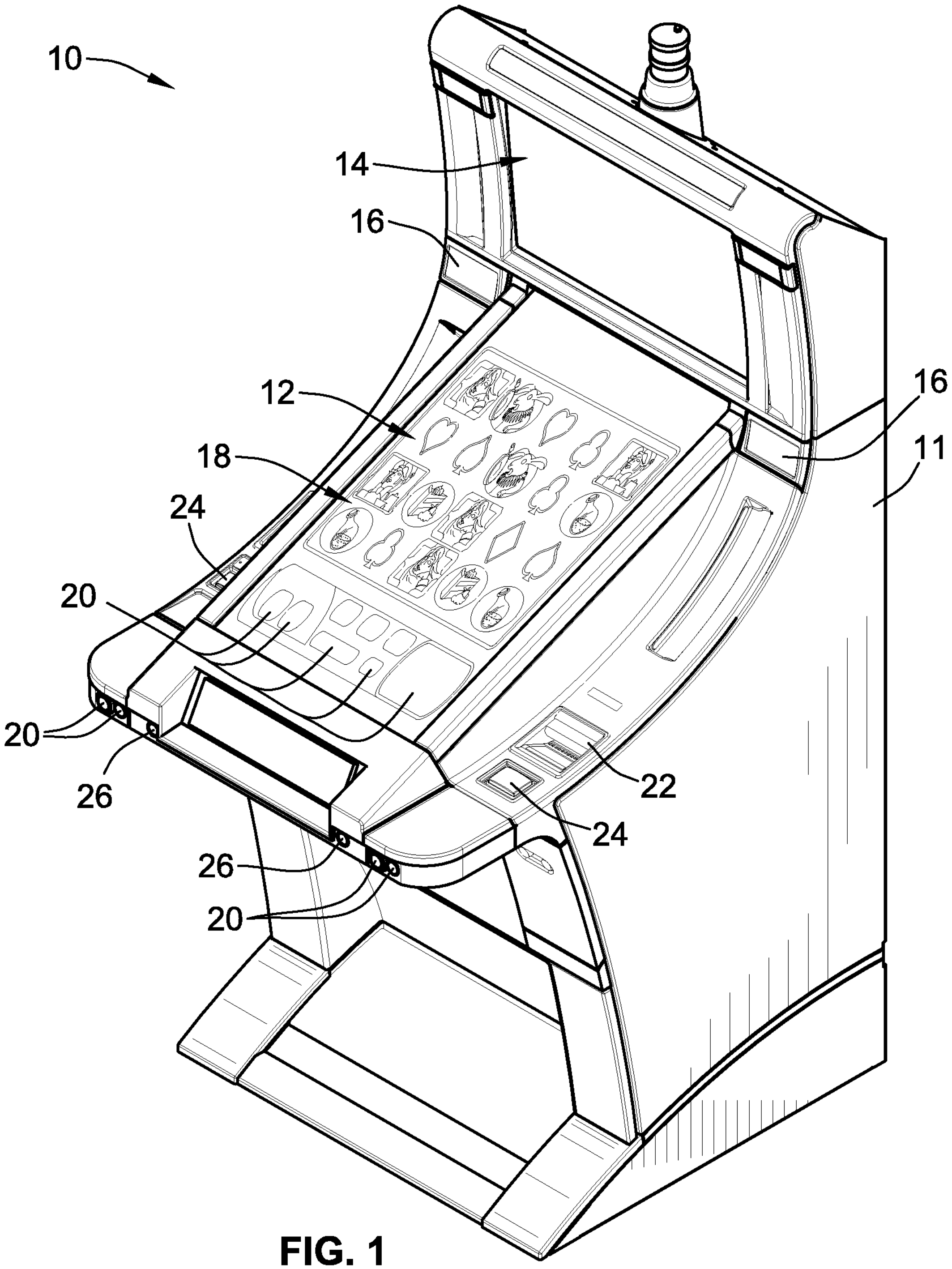
FIG. 1 is a perspective-view illustration of an example of a free-standing gaming terminal according to aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

This invention is susceptible of embodiment in many different forms. There are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to the drawings, wherein like reference numerals refer to like features throughout the several views, there is shown in FIG. 1 a representative gaming terminal 10 similar to those used in gaming establishments, such as casinos, hotels and cruise ships, and non-conventional gaming establishments, such as airports and restaurants. With regard to the present disclosure, the gaming terminal 10 may be any type of gaming terminal and may have varying structures and methods of operation. For example, in some aspects, the gaming terminal 10 is an electromechanical gaming terminal configured to play slots with mechanical reels, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models (as shown), handheld mobile devices, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 B2, U.S. Patent Application Pub. Nos. US 2010/0069160 A1 and US 2010/0234099 A1, and International Application No. PCT/US2007/000792, all of which are incorporated herein by reference in their respective entireties and for all purposes.

The gaming terminal 10 illustrated in FIG. 1 comprises a cabinet 11 that may house various input devices, output devices, and input/output devices. By way of non-limiting example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display may be disposed in front of the mechanical-reel display to portray a video image superimposed upon the mechanical-reel display. The display areas may variously display information associated with wagering games, non-wagering games, community games, progressive games, advertisements, services, premium entertainment, text messaging, emails, alerts, announcements, broadcast information, subscription information, etc., appropriate to the particular mode(s) of operation of the gaming terminal 10. The gaming terminal 10 includes a touch screen(s) 18 mounted over the primary and/or secondary areas 12, 14, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals can be selected from a group consisting essentially of an electrical current, an electrical voltage, an electrical charge, an optical signal, an optical element, a magnetic signal, and a magnetic element.

Figure 2:
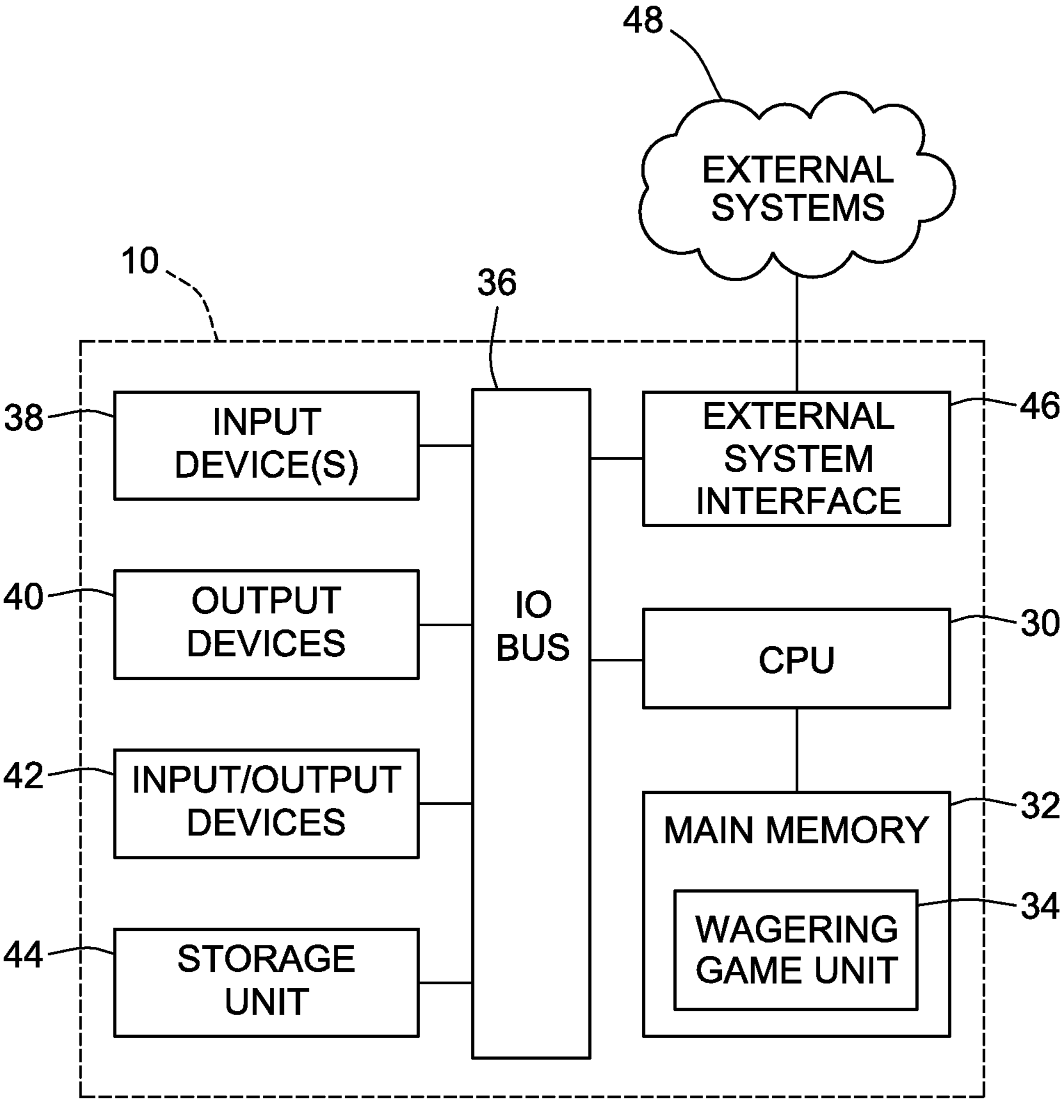
FIG. 2 is a schematic diagram of an example of a gaming machine in a representative gaming system according to aspects of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes a random number generator (RNG) for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
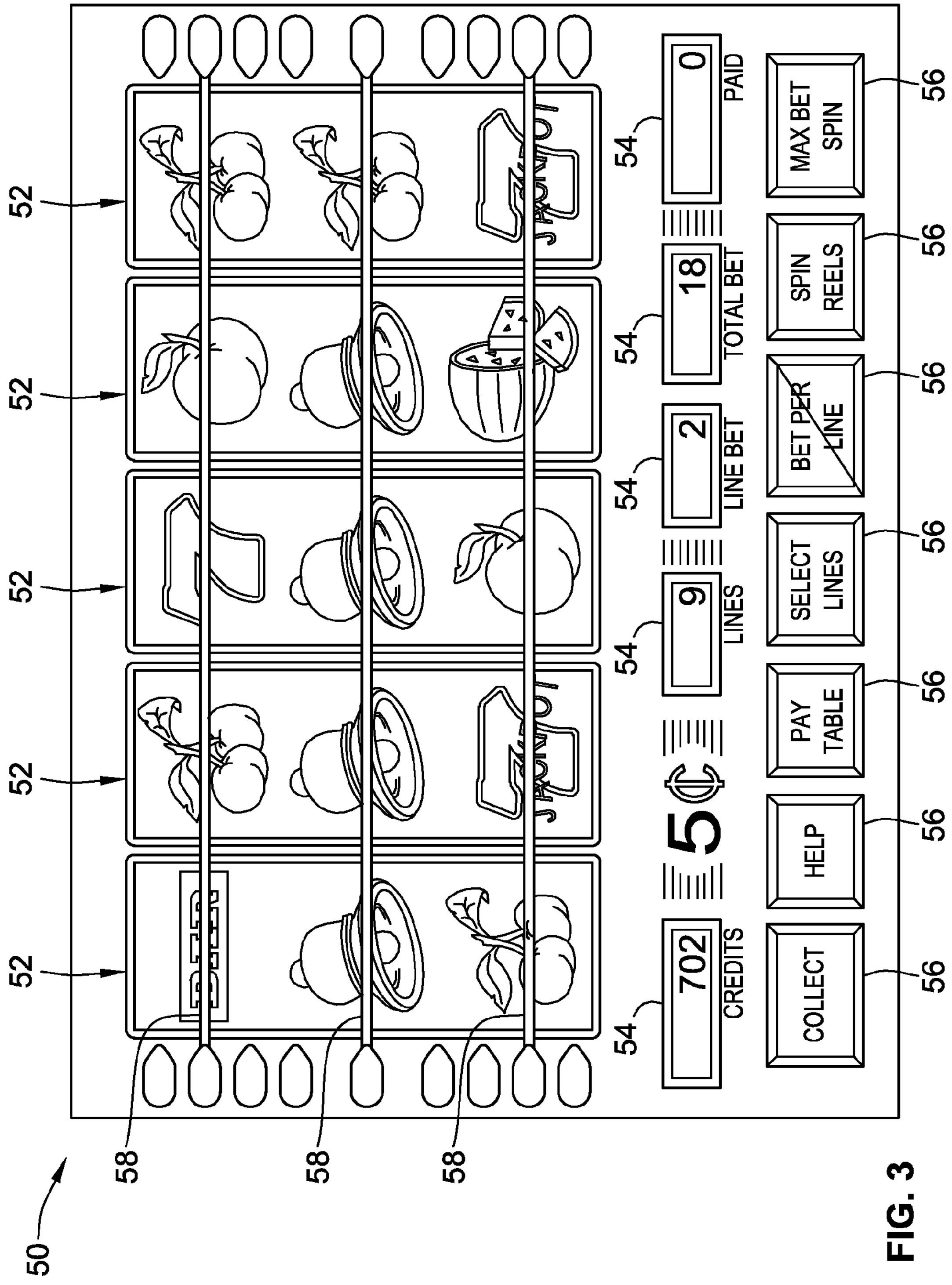
FIG. 3 is a screen shot of a representative basic-game screen of a wagering game displayed on a gaming terminal, gaming device, and/or gaming system according to aspects of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by an RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
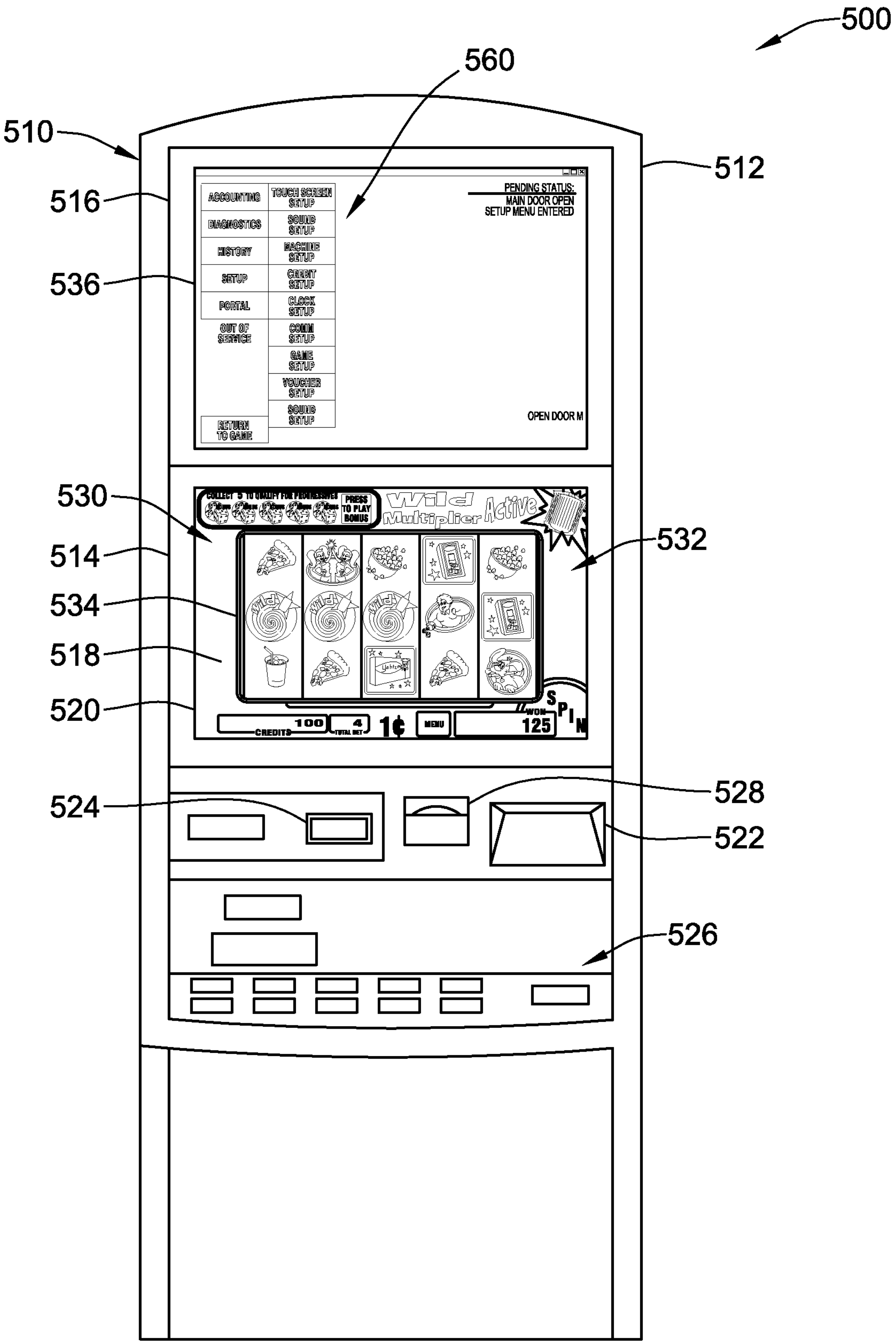
FIG. 4 is front-view illustration of a representative gaming terminal with a primary display, which is showing a screen shot of a wagering game, and a secondary display, which is showing a screen shot of an administrator configuration menu, in accordance with aspects of the present disclosure.

Referring now to FIG. 4, an exemplary gaming terminal, designated generally at 510, for playing one or more wagering games is shown in accordance with aspects of the present disclosure. Although differing in appearance, the gaming terminal 510 of FIG. 4 can be similar in function, operation, and connectivity to the gaming terminal 10 discussed above with respect to FIGS. 1 and 2 and, thus, can include any of the options, features and alternatives described above. For example, the gaming terminal 510 (also referred to herein as "wagering game machine" or "gaming machine") can take on various configurations including, for example, free standing gaming machines, handheld and portable gaming machines, countertop gaming machines, personal computers and laptop computers, smartphones and tablets, or any combination thereof. To that end, the gaming terminal 510 of FIG. 4 may be an electromechanical gaming terminal configured, for example, to play electromechanical slots, or it may be an electronic gaming terminal configured, for example, to play a video casino game, such as keno, poker, slots, blackjack, roulette, or a combination of both.

The illustrated gaming terminal 510, which is shown as an upright free-standing gaming terminal, comprises a cabinet 512 for housing and/or supporting a variety of operational componentry (e.g., CPU 42, memory 44, external systems interface 58, etc.). For output devices, the gaming terminal 510 includes, among other things, a primary display area (or "first display device") 514, and a secondary display area (or "second display device") 516. Optional configurations can include more display devices than the two shown in FIG. 4. For input devices, the gaming terminal 510 may include a touchscreen 518, a bill receiving and validating device 522, an information reader/writer(s) 524, a button panel 526, a coin acceptor 528, one or more other player input devices, and/or one or more player-accessible ports (e.g., an audio output jack for headphones, a video headset jack, an internet cable jack, a wireless transmitter/receiver, etc.). In the illustrated example, the button panel 526 includes: (1) a number of mechanical wager-selection pushbuttons that allow a player to specify a wager amount for each pay line selected; and, (2) a number of mechanical payline-selection pushbuttons that allow a player to select any of a number of possible payline configurations prior to spinning the reels. While these typical components found in the gaming terminal 510 are described above, it should be understood that numerous additional/alternative peripheral devices and other elements may exist and may be used in any number of combinations to create various forms of a gaming terminal.

The primary display device 514 of the gaming terminal 510, which may be part of an exemplary gaming system 500, provides a screen shot of a game screen from an exemplary wagering game in accordance with aspects of the present disclosure. The primary display device 514 of the gaming terminal 510 displays wagering games, such as those described above with respect to FIGS. 1-3 or those described below with respect to FIGS. 4-8, for example. The display devices 514, 516 may be any form of display, such as those described with reference to the free-standing gaming terminal 10 of FIG. 1. For instance, each of the display devices 514, 516 may comprise a plasma, LED, OLED, AMOLED, LCD, CRT, projection, or any other now-known or later-developed display device. Although numerous aspects of the wagering game 530 are all shown displayed on a single display device, namely the primary display 514, these aspects are not so limited and can be displayed in any combination on any number of display devices unless otherwise expressly prohibited.

The display device 514 displays or otherwise visually depicts a wagering game 530, which in this example is the slot game shown in FIG. 4. The slot game 530 includes a plurality of symbol-bearing reels, designated generally as 535-539 in FIG. 5, each having a plurality of distinct reel positions occupied by a number of symbols (collectively represented by symbols 545-547 in FIG. 4). The reels 535-539 may be electro-mechanical reels, computer-generated simulations of reels, other replicated forms of reels, or any combination and variation thereof. The symbols may include any variety of graphical symbols, emblems, elements, or representations, including symbols that are associated with one or more themes of the gaming terminal 510 and gaming system 500 (e.g., a Wild Multiplier Pizza Party theme). The symbols may also include a blank symbol or empty space. The symbols on the reels 535-539, when part of a wagering-game outcome, are arranged in an array 532, which in this embodiment is a 3×5 matrix—three rows by five columns—of distinct array positions. The reels 535-539 are varied (e.g., spun and stopped) to reveal combinations of symbols, which represent randomly selected outcomes of the wagering game 530, that are evaluated for winning combinations. Winning combinations of symbols landing, for example, on activated paylines (e.g., those paylines for which a wager has been received) which extend through the array positions, cause awards to be paid in accordance with one or more pay tables associated with the gaming system 500. In some embodiments, winning combinations of symbols include three or more like symbols aligned adjacent one another on an active pay line (e.g., left-to-right configuration, right-to-left configuration, or both). In some embodiments, symbol combinations are evaluated in accord with various other schemes such as, but not limited to, scatter pays.

Within the scope of this disclosure, the wagering game 530 can include greater or fewer than five symbol-bearing reels (simulated, mechanical, or otherwise), each of which may include greater or fewer reel positions than those shown in FIG. 4. In alternate embodiments, the randomly selected outcomes may comprise greater or fewer than 15 symbols, and may take on a variety of different forms having greater or fewer rows and/or columns. The matrix may even comprise other non-rectangular forms or arrangements of symbols. Moreover, the randomly selected outcomes of the wagering game 530 may be varied from the representation provided in FIG. 4. Likewise, the Pizza Party theme is purely illustrative and non-limiting in nature. In addition, the secondary display device 516 can be configured to display randomly determined bonus-game outcomes of the wagering game 530.

Figure 5:
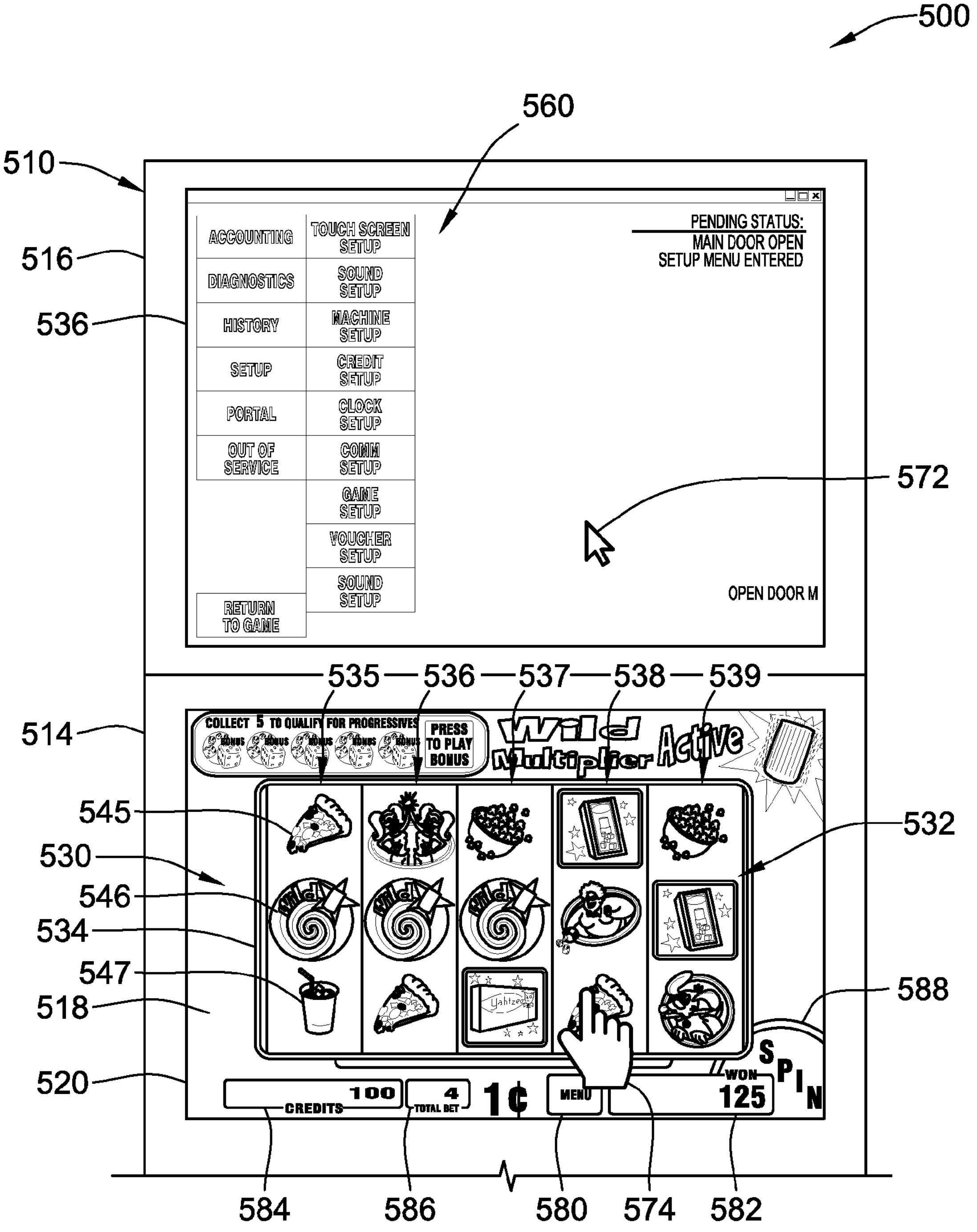
FIG. 5 is another front-view illustration of the primary and secondary displays of FIG. 4, portraying a user entering a first input through a touchscreen interface of the primary display to activate a selection mechanism displayed on the secondary display.

The primary display 514 further includes certain display features for providing information and options to a player. As seen in FIG. 5, for example, these display features may include a MENU button 580, a WON meter 582, a CREDITS meter 584, and a TOTAL BET meter 586. The MENU button 580 can be pressed and activated (e.g., through an overlying touch screen) by a player desiring to access other control menus, preferences, help screens, etc. For example, the player can change a theme of the wagering game 530 via the MENU button 580, or change the type of wagering game being played (e.g., to video poker, keno, etc.). The WON meter 582 displays to the player the amount of the total win (if any) from the most recent play of the wagering game 530. The CREDITS meter 584 displays to the player the total amount of credits, if any, remaining and available to the player for play of the wagering game 530. The TOTAL BET meter 586 displays to a player the current size of his/her wager (in credits). Fewer, additional or alternative display features may be included for presenting information/options to a player. The primary display 514 can also include, for example, an optional change-denomination feature that can be activated to change the denomination of wagers (e.g., from $0.25/credit to $0.10/credit) which the player is inputting into the system 500, and bet change buttons and that permit a player to incrementally increase and decrease, respectively, the size of his/her wager accordingly. Optionally, a "max bet spin" button may be provided, which automatically wagers a maximum number of credits and contemporaneously spins the reels 535-539 of the wagering game 530, as well as any of the buttons and meters displayed in FIG. 3.

The wagering game 530 is shown in FIG. 4 after play of a base game segment is initiated, for example, by the player providing a wager (e.g., responsive to an input via at least one input device), and thereafter pressing a spin button 588 or pulling a spin lever. The monetary wager, which is typically a selected number of credits, is deducted from the available credits, e.g., the 100 credits displayed via the CREDITS meter 584 in FIG. 5. The monetary wager or "bet" that is in play (e.g., 4 credits in FIG. 5) can be displayed via the TOTAL BET meter 586. The reels 535-539 may then be spun, and will continue to spin until they are stopped to reveal in the displayed array 532 reel symbols which represent a randomly selected outcome of the wagering game 530. The wagering-game outcome is, according to some aspects, randomly selected from a plurality of potential wagering-game outcomes. As indicated above, each outcome is evaluated for winning symbol combinations to determine if the displayed outcome has one or more awards associated therewith. In alternate embodiments, FIG. 4 can be representative of a bonus game segment of the wagering game 530.

A local controller (e.g., CPU 30 of FIG. 2), a host system (e.g., external system 48 of FIG. 2), a central controller, or any combination thereof, in alternative embodiments, operates to execute the wagering game program causing the display area 514 to display selected portions of the wagering game 530. An outcome of the wagering game 530, be it for a base portion, a bonus portion, a progressive portion, a community portion, or otherwise, can be randomly selected from a predetermined set of potential (base, bonus, progressive, community, etc.) wagering-game outcomes, for example, using a local or remote random number generator (RNG). The wagering-game outcome is then revealed, displayed, or otherwise communicated to the player, for example, on a corresponding display device 514. The game screen 514 displays the wagering-game outcome by portraying the reels 535-539 spinning and stopping to reveal reel symbols arranged in a 3-row, 5-column matrix—i.e., symbol array 532. A winning combination occurs, for example, when the displayed symbols correspond to one or more of the winning symbol combinations listed in a predetermined pay table. In response to a winning outcome, a wagering-game prize (e.g., a monetary award of credits) associated with that winning outcome is conferred upon the player.

As indicated above, the gaming terminal 510 is provided with a variety of peripheral devices by which a user can enter data and control signals to a CPU of the gaming terminal 510 and/or gaming system 500. One such peripheral input device is a primary display 514 with a touchscreen 518 (sometimes referred to in the art as a "touch screen" or a "touch-screen monitor") that is configured to receive user inputs, generally in the nature of physical contact between the user's hand(s) and the display 514, and output signals indicative thereof. The touchscreen 518 may take on a variety of now-known or hereafter developed forms, including resistive, capacitive, infrared, dispersive, optical, and surface acoustic wave (SAW) touchscreen devices. Additional information regarding touchscreen technology can be found, for example, in commonly owned U.S. Pat. No. 7,798,902 B2, to James M. Rasmussen, and U.S. Pat. No. 8,025,568 B2, to Timothy C. Loose et al., both of which are incorporated herein by reference in their respective entireties and for all purposes.

For some preferred embodiments, it may be desirable that the primary display 514 comprise a transmissive liquid crystal display (LCD) device 520 that is positioned in front of a plurality of mechanical symbol-bearing reels 535-539. The transmissive LCD device 520 may be operable in both a transmissive state, whereat a segment of each of the reels 535-539 is visible through at least a window portion 534 of the transmissive LCD device 520, and a non-transmissive state, whereat the transmissive LCD device 520 is operable to display images on the window portion 534 and/or the surrounding periphery thereof such that one or more of the reels 535-539 is at least partially visually obstructed. The transmissive LCD device 520 may, for example, be a transmissive LCD commercially available from LG Phillips LCD Co., Ltd., of Seoul, Korea. Some such configurations may require the touchscreen 518 span across and overlay at least a portion of the transmissive LCD device 520, including that portion which lies in front of the reels 535-539 and the surrounding periphery thereof. Additional information regarding gaming terminals employing transmissive LCD technology for operation in conjunction with mechanical slot reels for enhanced game play and functionality can be found, for example, in commonly owned U.S. Patent Application Pub. Nos. 2008/0096655 A1, to James Rasmussen et al., and 2012/0122549 A1, to James M. Rasmussen et al., both of which are incorporated herein by reference in their respective entireties and for all purposes. It may be desirable, in some optional implementations, that the transmissive LCD device 520 be operable to display images on select portions thereof except on the window portion 534.

Like the primary display 514, the secondary display 516 is operable to display game information to a user. The secondary display 516 may be in the nature of an electronic video display device 536, such as a high-definition (HD) digital LCD display panel, variously displaying features and information associated with wagering games, non-wagering games, community games, progressive games, advertisements, premium entertainment, alerts, broadcast information, subscription information, etc. In contrast to the primary display 514, it may be desirable that the secondary display 516 only be operable as an output device—e.g., peripheral computer hardware operable to communicate data processing carried out by a CPU of the gaming terminal 510 and/or gaming system 500 which converts electronically generated information into human-perceivable form. For example, unlike the primary display 514, the secondary display 516 may be characterized by a lack of a touchscreen or other user input mechanism.

Figure 6:
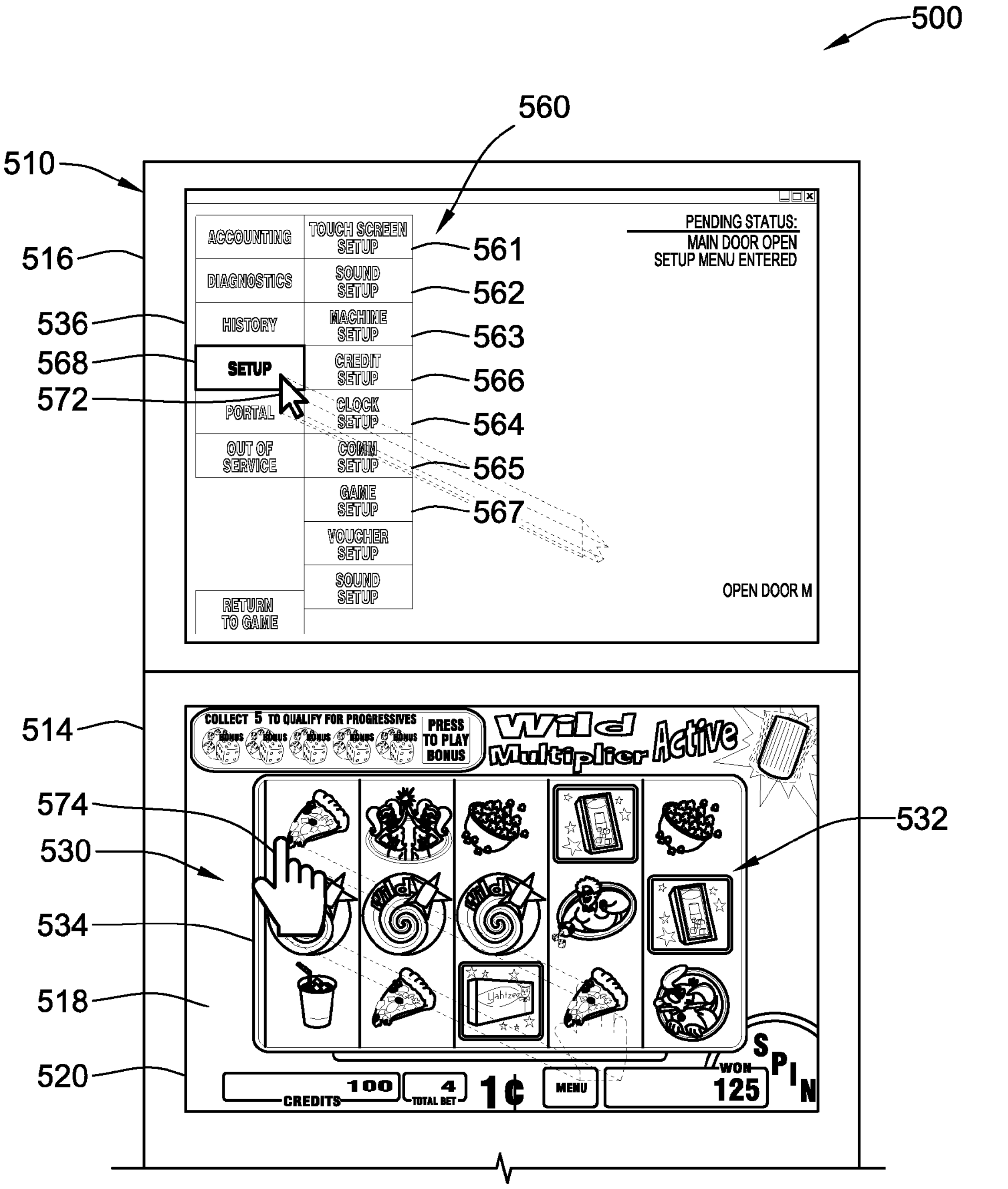
FIG. 6 is another front-view illustration of the primary and secondary displays of FIG. 4, portraying a user entering a second input through the touchscreen interface of the primary display to make a selection from the administrator configuration menu with the selection mechanism displayed on the secondary display.
Figure 7:
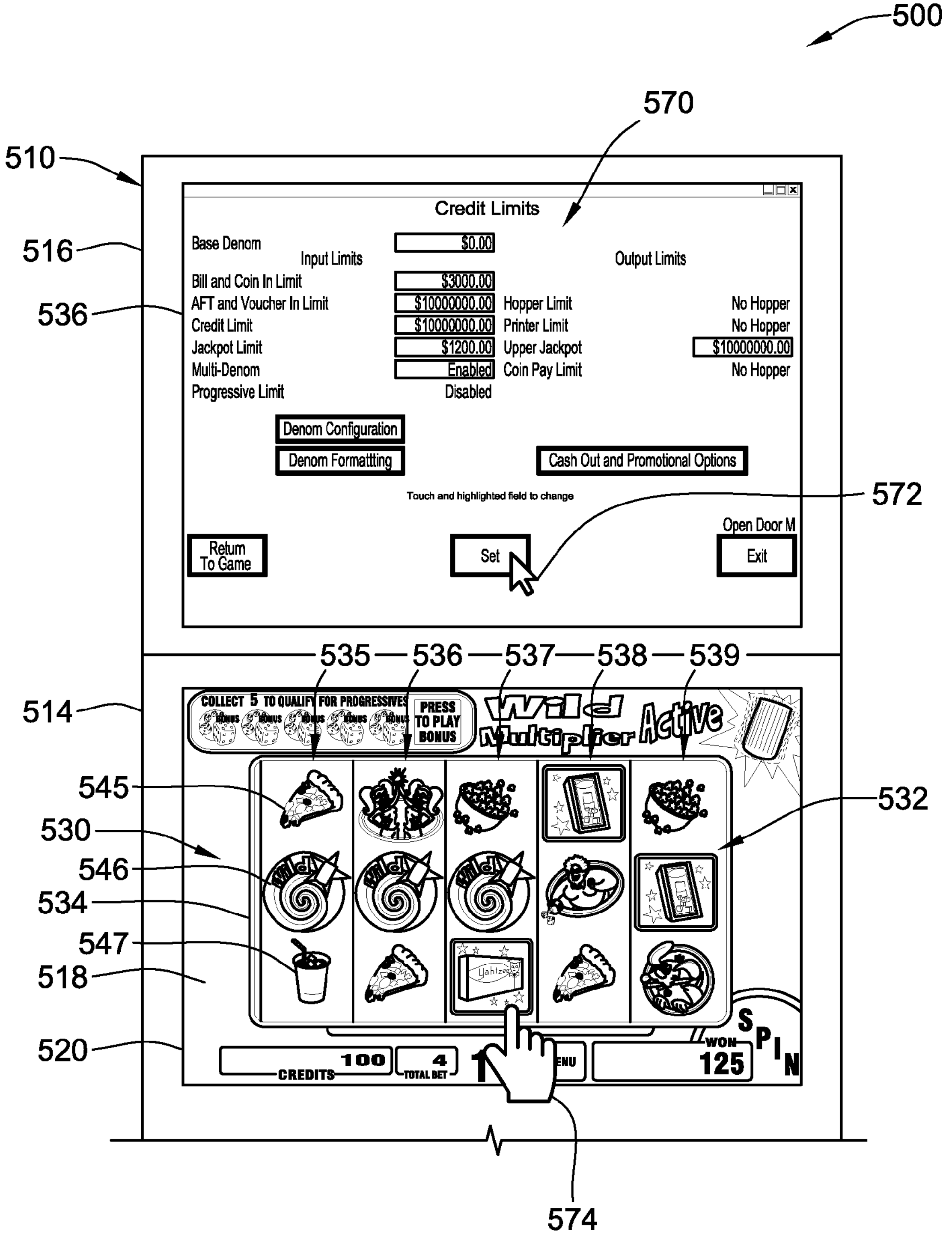
FIG. 7 is yet another front-view illustration of the primary and secondary displays of FIG. 4, with the secondary display showing a screen shot of the operator setup/configuration screen selected through inputs entered via the primary display from the administrator configuration menu displayed on the secondary display in FIG. 6.

In FIGS. 4-7, the secondary display 516 is shown displaying a plurality of user-selectable elements, some of which are collectively designated as 560 in FIGS. 4-6 and some of which are collectively designated as 570 in FIG. 7. These selectable elements 560 can include a variety of user-selectable operator setup options provided in an administrator configuration menu. By way of non-limiting example, the secondary display 516 in the illustrated example of FIG. 4 is displaying a number of operator setup/configuration screens which are typically made available during gaming machine setup. The gaming terminal 510 is configured with parameter values and/or parameter value combinations determined by the gaming machine manufacturer, for example, to provide optimum game play. Some of these parameter values/parameter value combinations are operator selectable during gaming machine configuration via setup options 560 displayed on the secondary display 516 of the gaming terminal 510. A number of setup options are available during gaming machine setup, such as TOUCH SCREEN SETUP 561, SOUND SETUP 562, MACHINE SETUP 563, CLOCK SETUP 564, COMMUNICATION SETUP 565, CREDIT SETUP option 566, GAME SETUP 567, etc.

Operator selection of some "manufacturer-limited" parameters or parameter combinations may be accomplished via selection of a CREDIT SETUP option 566. Selection of the CREDIT SETUP option 566 can enable an operator to: (1) select a base denomination value, (2) initiate multi-denomination selection, and (3) select and provision each of the denominations of the multi-denomination selections with one of a number of manufacturer-limited parameter values or parameter value combinations associated with the selected denomination. Each of the parameter values or parameter value combinations may include one of a number of different maximum pay line configurations and one of a number of different payback percentages. As a result, the maximum pay line configurations available to a player can vary within a single-themed game or within single themes of a multi-themed game. In addition, the operator can configure the gaming machine to generate the same payback percentage over time, even when different mathematical models are utilized by, for example, selecting different maximum pay line values, different probability tables, or other math parameter values during gaming machine setup. Selection of the CREDIT SETUP option 566 by an operator invokes performance of a credit setup routine by a controller (e.g., CPU 30 or external system(s) 48 of FIG. 2). In response to operator selections via the administrator configuration menu shown in FIG. 4, the CPU 30 causes the parameter values and/or parameter value combinations to be displayed to the operator. The CPU 30 and/or external system(s) 48 configures the gaming terminal 510 and the wagering game 530 in response to subsequent operator selection of the parameter values or parameter value combinations. Additional information regarding wagering game machine setup and configuration can be found, for example, in commonly owned U.S. Pat. No. 8,317,592 B2, to Peter R. Anderson et al. (hereinafter the "'592 Patent"), which is incorporated herein by reference in its entirety and for all purposes.

In accord with aspects of the disclosed concepts, selections from the administrator configuration menu shown on the second display device 516 are made by way of the user interface provided by the touchscreen 518 of the first display device 514. For instance, the second display device 516 is shown in FIG. 5 displaying a selection mechanism, exemplified in the drawings by a display-generated cursor 572, in response to a first user input received from a user via the touchscreen 518 of the first display device 514. The first user input (also referred to herein as "activation input") is represented in FIG. 5 with a user's finger or hand 574 touching the touchscreen 518 of the primary device 514. Responsive to detection of the first user input, the touchscreen 518 will output an activation signal to the CPU 30 indicating receipt of the user input, which in turn will direct the electronic video display device 536 of the secondary display 514 to display the cursor 572. Recognizably, the first user input may take on alternative forms, such as a tapping or swiping of the touchscreen 518, which may be achieved with the user's hand or, conceivably, any other appendage.

Some embodiments may require the user maintain contact with the touchscreen 518 in order for the cursor 572 to remain visible on the secondary display 516. For some embodiments, the selection mechanism 572 is not displayed by the second display device 516 (i.e., it is "hidden") until the first user input is received from the user via the touchscreen of the first display device. In a similar regard, the selection mechanism 572 may be hidden by the second display device 516 when the gaming terminal 510 is not in the administrator mode (e.g., during game operation). Although shown as an arrow in FIGS. 5-7, the selection mechanism 572 may take on a variety of alternative shapes and forms and mechanisms for indicating a position, selection, and/or insertion point on a display device that will respond to an input from a user input device. For example, the cursor may be a square or circle or other geometric shape, or may alternatively resemble a hand, crosshair, pen or other familiar and distinguishable form. Optionally, the selection mechanism 572 may omit a cursor altogether; one such configuration includes a selection mechanism that acts to highlight a selectable element when the user's input (e.g., finger location on the touchscreen 518 of the primary display 514) corresponds to the location of that selectable element on the secondary display 516.

For some of the disclosed embodiments, the touchscreen 518 of the primary display 514 is absolutely mapped to the display area of the electronic video display device 536 of the secondary display 516 such that each touch-sensitive location of the touchscreen 518 corresponds to a respective location, e.g., of the displayed selection mechanism 572 on the secondary display 516. Absolute mapping may be considered a one-to-one correlation between the finger input 574 location and the cursor 572 position, for example, on coinciding Cartesian coordinate systems. FIG. 5 presents an instance of absolute mapping wherein the user's finger 574 is touching the touchscreen 518 approximately 9.7 inches to the right and approximately 3.2 inches up from the bottom left-hand corner of the transmissive LCD device 520; concomitantly, the cursor 572 is displayed approximately 9.7 inches to the right and approximately 3.2 inches up from the bottom left-hand corner of the electronic video display device 536. Absolute mapping may be desirable in configurations where the touch-sensitive area of the touchscreen 518 and the display area of the video display device 536 are approximately the same size.

Alternatively, the touchscreen 518 of the primary display 514 is relatively mapped to the display area of the electronic video display device 536 of the secondary display 516 such that a user can enter inputs on any touch-sensitive location of the touchscreen, or any touch-sensitive location within a select subsection of the touchscreen, to control the selection mechanism 572 displayed on the secondary display 516. Relative mapping may be considered a variable correlation between the finger input 574 location and the cursor 572 position. For instance, once the cursor 752 is displayed on the secondary display 516, the user may then make selections with and manipulate the motion of the cursor 752 via inputs entered on any touch-sensitive portion of the touchscreen 518. In addition, or alternatively, there may be a variable correlation between the finger input 574 movement and cursor 572 movement such that for every increment (e.g., one centimeter) the user's finger moves, the cursor 572 responsively moves by a predetermined multiple of that increment (e.g., three centimeters). In one implementation, the primary display 516 may display a designated input area, such as a square-shaped touch zone, which operates in a manner similar to a touchpad (or "trackpad") that translates the position and motion of a user's finger on the touchscreen 518 to a relative position on the secondary display 516. Relative mapping may be desirable in configurations where the touch-sensitive area of the touchscreen 518 is markedly different in size than the display area of the video display device 536.

Responsive to a second user input received from the user via the touchscreen 518 of the first display device 514, the second display device 516 displays the selection mechanism 572 selecting one or more of the displayed user-selectable elements 560. Prior to making a selection, the second display device 516 can display the selection mechanism 572 moving towards and then designating one of the user-selectable elements 560 in response to a third user input received from the user via the touchscreen 518 of the first display device 514. For instance, FIG. 6 illustrates the cursor 572 moving in a generally diagonal right-to-left direction across the second display device 516 in response a third user input (also referred to herein as "control input"), which is represented in the drawings by the user sliding or swiping his/her finger 574 in a similar (or identical) right-to-left manner across the touchscreen 518 of the primary display 514. This may include the touchscreen 518 emitting a control signal to the CPU 30 indicating receipt of the control input, and the CPU 30 in turn directing the electronic video display device 536 of the secondary display 516 to display the cursor 572 moving to and at least partially overlapping one of the user-selectable operator setup options 560. Then, responsive to a second user input (also referred to herein as "selection input"), a selection signal is output from the touchscreen 518 to the CPU 30, which in turn directs the electronic video display device 536 to display the cursor 572 selecting one of the user-selectable elements 560 (e.g., the SETUP option 568 in FIG. 6). Thereafter, the secondary display 516 may display the cursor 572 disappearing.

In some embodiments, the activation input (first user input) comprises the user touching the touchscreen 518 with one or more fingers, the control input (third user input) comprises the user sliding that same finger(s) across the touchscreen 518 in a continuous motion and without lifting the finger(s), and the selection input (second user input) includes the user removing the finger(s) from and, thus, releasing his/her contact with the touchscreen 518. Such a configuration allows the operator to touch the primary display 514 anywhere on the touchscreen 518 to initially activate and display the previously hidden cursor 572 without it initially registering as a selection event. Like the first user input, the second and third user inputs may take on various alternative forms. For example, the control input need not necessarily be a continuous, uninterrupted motion. Likewise, the selection input, as an alternative to the aforementioned "touch-and-release" configuration, may comprise a double tap of the corresponding location of the touchscreen 518, may be the result of a change in contact pressure (e.g., the touchscreen 518 is pressure sensitive), can be gesture sensitive (e.g., single touch as activation input, generally linear or long arcuate motions as control input, and circular motion as selection input), or can be contact-area sensitive (e.g., single finger to activate and/or move the cursor 572, and two fingers to make a selection).

In response to operator selection of a SETUP option 568 and the CREDIT SETUP option 566, the CPU 30 and/or external system(s) 48 cause a "Credit Limits" screen (shown in FIG. 7) to be displayed on the secondary display 516. The Credit Limits screen presents the operator with a number of selectable fields 570 which enable operator input of monetary input limit values (e.g., a Bill and Coin In Limit, a Credit Limit, a Jackpot Limit, etc.) and monetary output limit values (e.g. a Hopper Limit, a Printer Limit, an Upper Jackpot, a Coin Pay Limit, etc.) for the gaming terminal 510. The Credit Limits screen of FIG. 7 is also configured with a "Base Denom" field which enables the operator to input a base denomination value for subsequent game play. In some embodiments, when the Base Denom field is selected by the operator via the cursor 572 through operation of the touchscreen 518, a pop-up window with a numerical keypad (not shown) can be displayed on the secondary display 516 or, alternatively, on the primary display 514. Using this numerical keypad, the operator selects a base denomination value for gaming machine play. The base denomination values available for gaming machine setup can be displayed at the bottom of the Credit Limits screen. After operator selection of the base denomination value followed by selection of an "enter" button on the numerical keypad, the Credit Limits screen displays the selected base denomination value (e.g., $0.05) in the Base Denom field of FIG. 7. Additionally, a status of a Multi-Denom field from can be changed from "Not Set" to "Enabled" (FIG. 7).

For some optional embodiments, the second display device 516 which operates to display the user-selectable elements 560, 570 can be external to the cabinet of the gaming terminal 510, such as a community display associated with a bank of gaming terminals or a progressive jackpot display associated with a Local Area Progressive Game or a Wide Area Progressive Game. In this regard, the selectable elements 560 can include a variety of operator setup options provided in an administrator configuration menu to configure: (a) an adjacent gaming terminal, (b) a select number of gaming terminals, (c) a bank of gaming terminals, (d) the parameters of a community game, (e) the parameters of a progressive jackpot, etc. Other optional embodiments allow operators to make selections from the secondary display 516 through use of an external mouse, trackpad, or other external user input device that can plug into or otherwise communicatively connect with the gaming terminal 510. In some embodiments, the user input device used to make selections from the administrator configuration menu may be a combination of one or more touchscreens, which may optionally operate with one or more other input devices, such as those enumerated in the preceding sentence or those discussed above. As another optional configuration, the selectable elements 560, 570 may span several secondary displays, both resident to and remote from the cabinet 512. Yet another option may allow an operator to select which one or ones of a plurality of secondary display devices will be controlled at a particular time by a particular primary display user interface.

Figure 8:
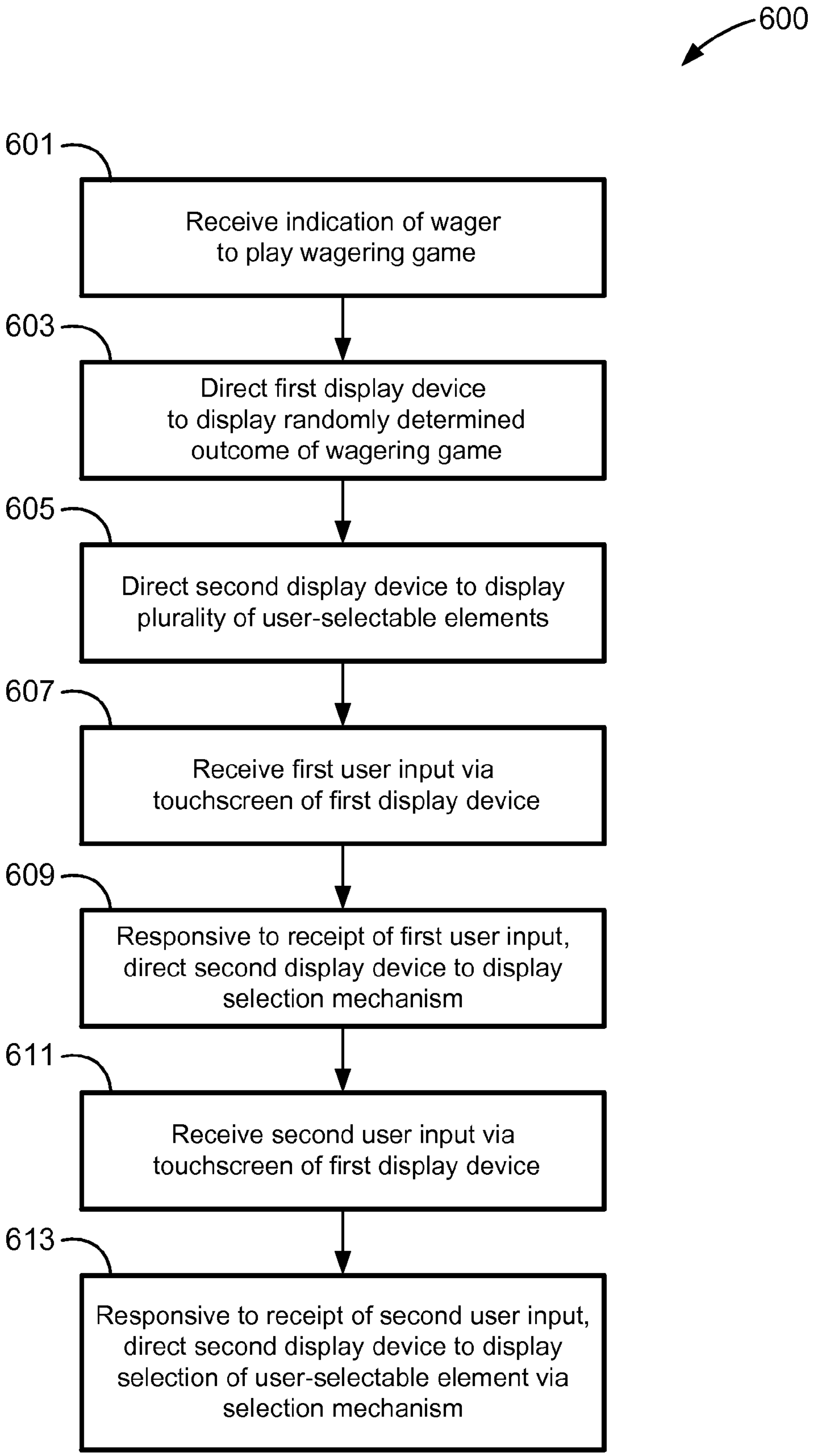
FIG. 8 is a flowchart for an exemplary method or algorithm that can correspond to instructions that can be stored on one or more non-transitory computer-readable media and can be executed by one or more controllers in accord with aspects of the disclosed concepts.

With reference now to the flow chart of FIG. 8, an improved method for operating and configuring a gaming terminal and/or a gaming system, such as those shown in FIGS. 1-7, for example, is generally described at 600 in accordance with aspects of the present disclosure. FIG. 8 can be representative of an algorithm that corresponds to at least some instructions that can be stored, for example, in main memory 32 of FIG. 2, and executed, for example, by the CPU 30 and/or external system(s) 48 of FIG. 2 to perform any or all of the above or below described functions associated with the disclosed concepts. The method 600 will be described with reference to the various aspects and features shown in FIGS. 4-7 of the drawings; such reference is being provided purely by way of explanation and clarification.

The method 600 starts at block 601 with receiving (e.g., via an input device such as touch screen 18, bill validator 22, information reader/writer 24, etc.) an indication of a wager to play a wagering game. An outcome of a base-game portion (or, alternatively, a bonus-game portion, a progressive-game portion, a community-game portion, etc.) of the wagering game is randomly determined. This may include, as indicated above, an RNG generating a random number, game logic for determining the outcome based on the randomly generated number, and the CPU 30, the external system 48, or both, in alternative embodiments, operating to execute a wagering game program, and game assets (e.g., art, sound, etc.) for presenting the determined outcome to a player in a visual manner. The method 600 then displays the outcome of the wagering game to the player at block 603. The base-game outcome of the wagering game can be visually represented by a plurality of symbols arranged on a first display device, such as the symbols on the slot reels 535-539 that are arranged in the symbol array 532 of FIG. 4.

At block 605, the method 600 directs a second display device to display a plurality of user-selectable elements. These displayed elements can comprise the user-selectable operator setup options 560 provided by the secondary display 516 in FIGS. 4-6, the user-selectable operator setup options 570 provided by the secondary display 516 in FIG. 7, or any of the administrator menus and options disclosed in the '592 Patent, as some non-limiting examples. A first user input is then received via a touchscreen of the first display device in block 607. The first user input may comprise a user's finger or hand 574 touching the touchscreen 518 of the primary device 514, as shown in FIG. 5.

The method 600 continues to block 609 where, responsive to receipt of the first user input, the second display device is controlled to display a selection mechanism. By way of example, and not limitations, in response to detection of an activation input, the touchscreen 518 will output an activation signal to the CPU 30 indicating receipt of the user input, and the CPU 30 will responsively direct the electronic video display device 536 of the secondary display 514 to display a cursor 572. Subsequently, a second user input is received via the touchscreen of the first display device, as indicated at block 611. The second user input, in some embodiments, comprises the touch-and-release scheme described above with respect to FIG. 6. In response to receipt of the second user input, block 613 requires directing the second display device to display the selection mechanism selecting one or more of the user-selectable elements. For example, responsive to a selection input, a selection signal is output from the touchscreen 518 to the CPU 30, which in turn directs the electronic video display device 536 to display the cursor 572 selecting one of the user-selectable elements 560 (e.g., the SETUP option 568 in FIG. 6). Thereafter, the secondary display 516 may display the cursor 572 disappearing.

In some embodiments, the method 600 includes at least those steps enumerated above. It is also within the scope and spirit of the present invention to omit steps, include additional steps, and/or modify the order presented above. It should be further noted that the method 600 illustrated in FIG. 6 can be representative of a single sequence for playing a wagering game. However, it is expected that the method 600 will be practiced in a systematic and repetitive manner.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software can form an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.). Also, some or all of the machine readable instructions represented in any flowchart depicted herein can be implemented manually. Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

It should be noted that the algorithms illustrated and discussed herein as having various modules or blocks or steps that perform particular functions and interact with one another are provided purely for the sake of illustration and explanation. It should be understood that these modules are merely segregated based on their function for the sake of description and represent computer hardware and/or executable software code which can be stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While many embodiments and modes for carrying out the present invention have been described in detail above, those familiar with the art to which this invention relates will recognize various alternative designs and embodiments for practicing the invention within the scope of the appended claims.

What is claimed is:

1. An electronic gaming machine primarily dedicated to conducting a casino wagering game, the gaming machine comprising:

- a gaming cabinet configured to house electronic components;
- game-logic circuitry disposed within the gaming cabinet;
- a first display device coupled to the gaming cabinet;
- a second display device coupled to the gaming cabinet;
- one or more controllers; and
- a memory storing instructions that, when executed by the one or more controllers, causes the gaming machine to:
- conduct, using the game-logic circuitry, play of the casino wagering game based, at least in part, on one or more random elements generated by a random element generator;
- display, using the first display device, aspects of the casino wagering game, the first display device including a touchscreen configured to receive physical inputs from a user and transform the physical inputs into electronic data signals; and
- display, using the second display device, a plurality of user-selectable operator setup options, each of the user-selectable operator setup options being adapted to configure operation of the gaming machine, the second display device being further configured to display a selection mechanism in response to a first user input received from a user via the touchscreen of the first display device; and
- display, using the second display device, in response to a second user input received from the user via the touchscreen of the first display device, the selection mechanism selecting at least one of the displayed user-selectable operator setup options.

2. The gaming machine of claim 1, wherein the second display device is further configured, in response to a third user input received from the user via the touchscreen of the first display device, to display the selection mechanism moving towards and then designating one of the user-selectable operator setup options prior to selecting the user-selectable operator setup options.

3. The gaming machine of claim 1, wherein the first user input includes the user touching the touchscreen of the first display device, and the second user input includes the user releasing the touching of the touchscreen.

4. The gaming machine of claim 1, wherein the user-selectable operator setup options are provided in an administrator configuration menu displayed by the second display device.

5. The gaming machine of claim 1, wherein the selection mechanism is a display-generated cursor.

6. The gaming machine of claim 1, wherein the selection mechanism is not displayed by the second display device until the first user input is received from the user via the touchscreen of the first display device.

7. The gaming machine of claim 1, wherein the second display device is characterized by a lack of a touchscreen.

8. The gaming machine of claim 1, wherein the touchscreen of the first display device is absolutely mapped to the display area of the second display device such that each touch-sensitive location of the touchscreen corresponds to a respective location of the selection mechanism displayed on the second display device.

9. The gaming machine of claim 1, wherein the touchscreen of the first display device is relatively mapped to the display area of the second display device such that the user can enter inputs on any touch-sensitive location of the touchscreen or any touch-sensitive location within a select subsection of the touchscreen to control the selection mechanism displayed on the second display device.

10. The gaming machine of claim 1, wherein the first display device is configured to display randomly determined base-game outcomes of the wagering game, and the second display device is configured to display randomly determined bonus-game outcomes of the wagering game.

11. The gaming machine of claim 1, wherein the first display device includes a transmissive liquid crystal display (LCD) device that is positioned in front of a plurality of electro-mechanical reels.

12. The gaming machine of claim 11, wherein the transmissive LCD device includes a window portion through which the mechanical reels are visible, the transmissive LCD device being operable to display images on select portions thereof except on the window portion.

13. A gaming system primarily dedicated to conducting a wagering game, the gaming system comprising:

- an electronic slot machine with a gaming cabinet;
- an electronic input device coupled to the gaming cabinet and configured to receive player inputs to play the wagering game and output electronic signals indicative thereof;
- a first display device coupled to the gaming cabinet and configured to display aspects of the wagering game, the first display device including a touchscreen configured to sense user inputs and output electronic signals indicative thereof;
- a second display device coupled to the gaming cabinet and configured to display aspects of the wagering game and a variety of user-selectable operator setup options;
- one or more random element generators configured to generate one or more random elements associated with play of the wagering game;
- one or more processors operatively connected to the first display device and the second display devices to transmit signals therebetween; and
- one or more memory devices storing instructions that, when executed by at least one of the one or more processors, cause the gaming system to:
  - receive, by use of the electronic input device of the electronic slot machine, an electronic signal as an indication of a wager from the player to play the wagering game;
  - responsive to the received indication of the wager, determine an outcome of the wagering game based, at least in part, on a random element generated by at least one of the one or more random element generators;
  - direct the first display device to display the outcome of the wagering game;
  - transmit an award to the player in response to the outcome meeting at least one predetermined award criterion;

direct the second display device to display the user-selectable operator setup options;

responsive to a first signal from the touchscreen of the first display device indicating receipt of a first user input, direct the second display device to display a selection mechanism; and responsive to a second signal from the touchscreen of the first display device indicating receipt of a second user input, direct the second display device to display the selection mechanism selecting at least one of the user-selectable operator setup options.

14. A method of operating an electronic gaming machine primarily dedicated to conducting a wagering game, the gaming machine having a cabinet housing electronic components operable for conducting the wagering game, one or more electronic input devices coupled to the gaming cabinet and configured to receive one or more physical inputs from a player and generate one or more electronic data signals indicative thereof, one or more electronic display devices coupled to the gaming cabinet and configured to display aspects of the wagering game, one or more controllers, and a memory storing instructions that, when executed by the one or more controllers, causes the gaming machine to perform the method, the method comprising:

receiving, via at least one of the one or more electronic input devices, a physical input from a player as an indication of a wager to play the wagering game;

initiating, via at least one of the one or more controllers, the wagering game in response to the received wager;

determining, via at least one of the one or more controllers, an outcome of the wagering game based, at least in part, on one or more random elements generated by at least one of one or more random element generators;

displaying, via a first of the one or more display devices, the randomly determined outcome of the wagering game, the first display device including a touchscreen configured to receive physical inputs from a user and transform the physical inputs into electronic data signals;

directing, via at least one of the one or more processors, a second of the one or more display devices to display a plurality of user-selectable operator setup options, each of the operator setup options being adapted to configure operation of the gaming machine;

receiving, via the touchscreen of the first display device, a first user input;

responsive to receipt of the first user input via the touchscreen of the first display device, directing the second display device to display a selection mechanism;

receiving, via the touchscreen of the first display device, a second user input; and responsive to receipt of the second user input via the touchscreen of the first display device, directing the second display device to display the selection mechanism selecting at least one of the user-selectable operator setup options.

15. The method of claim 14, further comprising:

receiving, via the touchscreen of the first display device, a third user input; and responsive to receipt of the third user input via the touchscreen of the first display device, directing the second display device to display the selection mechanism moving towards and then designating one of the user-selectable operator setup options prior to selecting the user-selectable element.

16. The method of claim 14, wherein the first user input includes the user touching the touchscreen of the first display device, and the second user input includes the user releasing the touching of the touchscreen.

17. The method of claim 14, wherein the user-selectable operator setup options are provided in an administrator configuration menu displayed by the second display device.

18. The method of claim 14, wherein the touchscreen of the first display device is absolutely mapped to the display area of the second display device such that each touch-sensitive location of the touchscreen corresponds to a respective location of the selection mechanism displayed on the second display device.

19. The method of claim 14, wherein the first display device includes a transmissive liquid crystal display (LCD) device that is positioned in front of a plurality of mechanical reels.

20. The method of claim 14, wherein the first display device is configured to display randomly determined base-game outcomes of the wagering game, and the second display device is configured to display randomly determined bonus-game outcomes of the wagering game.

* * * * *